US011036122B2

(12) United States Patent
Fukui et al.

(10) Patent No.: US 11,036,122 B2
(45) Date of Patent: Jun. 15, 2021

(54) PHASE MODULATION DATA GENERATING UNIT, ILLUMINATION UNIT, AND PROJECTOR

(71) Applicant: SONY CORPORATION, Tokyo (JP)

(72) Inventors: Kenichi Fukui, Kanagawa (JP); Yoshihisa Sato, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/612,582

(22) PCT Filed: Apr. 13, 2018

(86) PCT No.: PCT/JP2018/015519
§ 371 (c)(1),
(2) Date: Nov. 11, 2019

(87) PCT Pub. No.: WO2018/211878
PCT Pub. Date: Nov. 22, 2018

(65) Prior Publication Data
US 2020/0183260 A1    Jun. 11, 2020

(30) Foreign Application Priority Data
May 19, 2017 (JP) .............................. JP2017-099851

(51) Int. Cl.
*G03B 21/20* (2006.01)
*G03B 21/00* (2006.01)
(Continued)

(52) U.S. Cl.
CPC ....... *G03B 21/2053* (2013.01); *G03B 21/005* (2013.01); *G03H 1/16* (2013.01); *G03H 1/2294* (2013.01)

(58) Field of Classification Search
CPC .. G03B 21/005; G03B 21/006; G03B 21/008; G03B 21/147; G03B 21/208;
(Continued)

(56) References Cited

U.S. PATENT DOCUMENTS

2008/0088914 A1* 4/2008 Toyooka ................ H04N 9/315
359/315
2009/0207466 A1 8/2009 Bucklay
(Continued)

FOREIGN PATENT DOCUMENTS

| JP | 2016-224451 A | 12/2016 |
| WO | 2007/110668 A2 | 10/2007 |
| WO | 2016/208171 A1 | 12/2016 |

OTHER PUBLICATIONS

International Search Report and Written Opinion of PCT Application No. PCT/JP2018/015519, dated Jul. 17, 2018, 07 pages of ISRWO.

*Primary Examiner* — Sultan Chowdhury
(74) *Attorney, Agent, or Firm* — Chip Law Group

(57) ABSTRACT

A phase modulation data generating unit according to the present disclosure includes: a first calculating section; and a storage section. The first calculating section calculates basic phase modulation pattern data on the basis of a partial illumination image pattern that makes it possible to generate an intended illumination image pattern having a desired luminance distribution. The basic phase modulation pattern data makes it possible for a light phase modulation device to reconstruct the partial illumination image pattern. The storage section stores the basic phase modulation pattern data calculated by the first calculating section.

7 Claims, 8 Drawing Sheets

(51) Int. Cl.
*G03H 1/16* (2006.01)
*G03H 1/22* (2006.01)

(58) Field of Classification Search
CPC .. G03B 21/2033; G03B 21/2053; G09G 5/00; G09G 5/36; G09G 5/38; G03H 1/08; G03H 1/12; G03H 1/16; G03H 1/22; G03H 1/2294
See application file for complete search history.

(56) References Cited

U.S. PATENT DOCUMENTS

| | | | |
|---|---|---|---|
| 2010/0060962 A1* | 3/2010 | Rosen | G03H 1/06 359/29 |
| 2010/0271676 A1* | 10/2010 | Renaud-Goud | G03H 1/22 359/9 |
| 2014/0009807 A1* | 1/2014 | Pan | G03H 1/26 359/9 |
| 2015/0185523 A1* | 7/2015 | Matsumoto | G02F 1/1313 359/238 |

\* cited by examiner

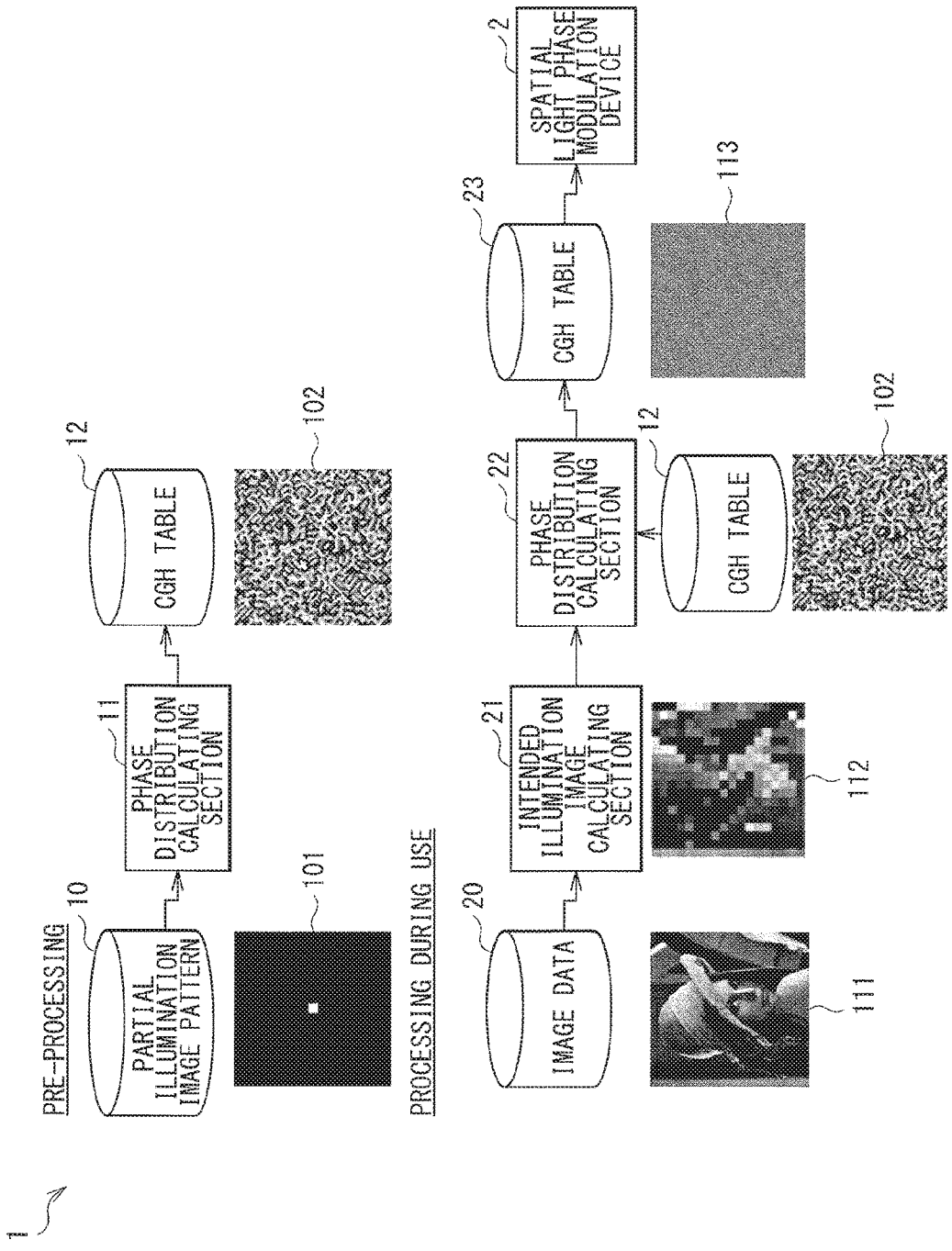
[FIG. 1]

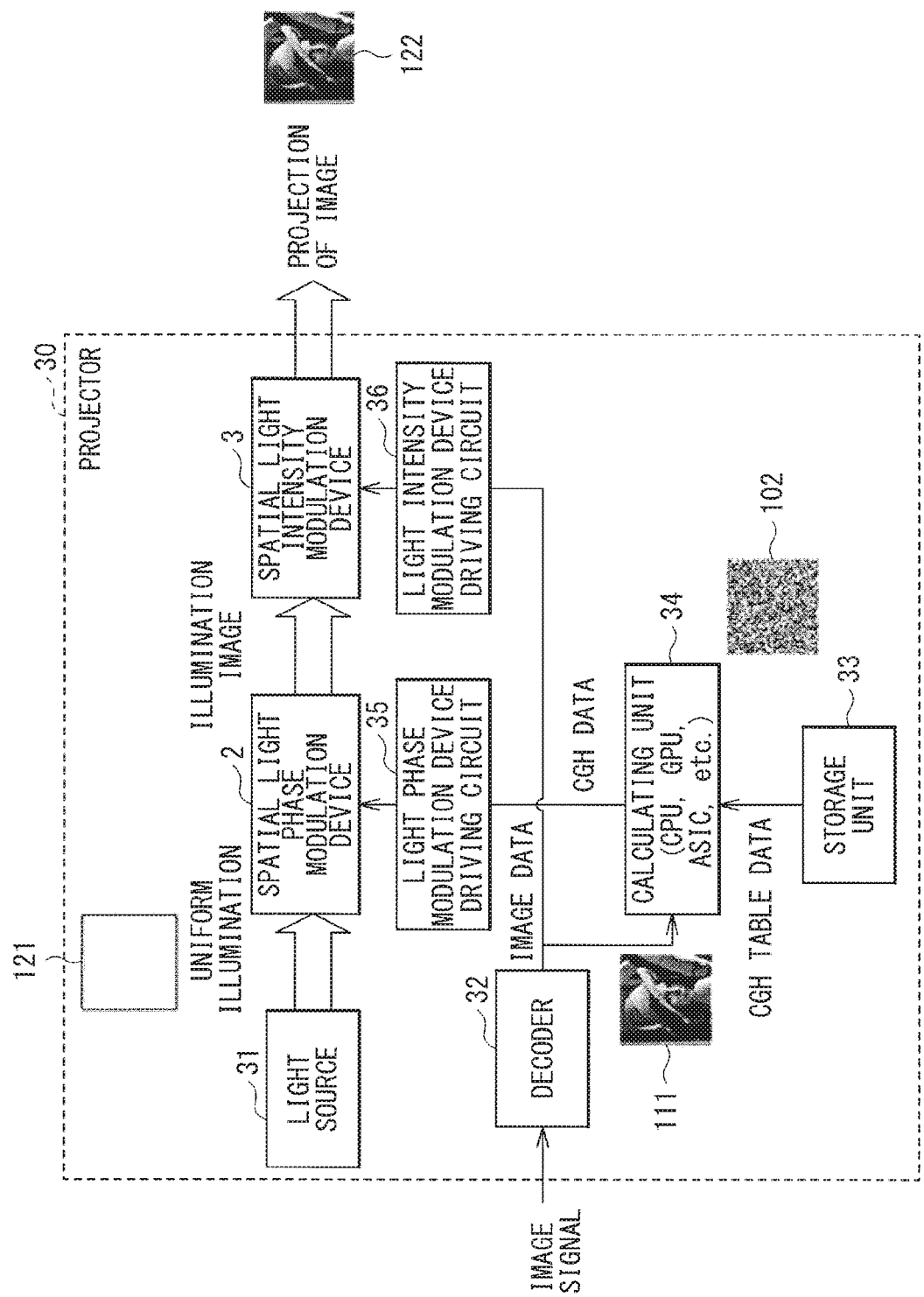

[FIG. 3]
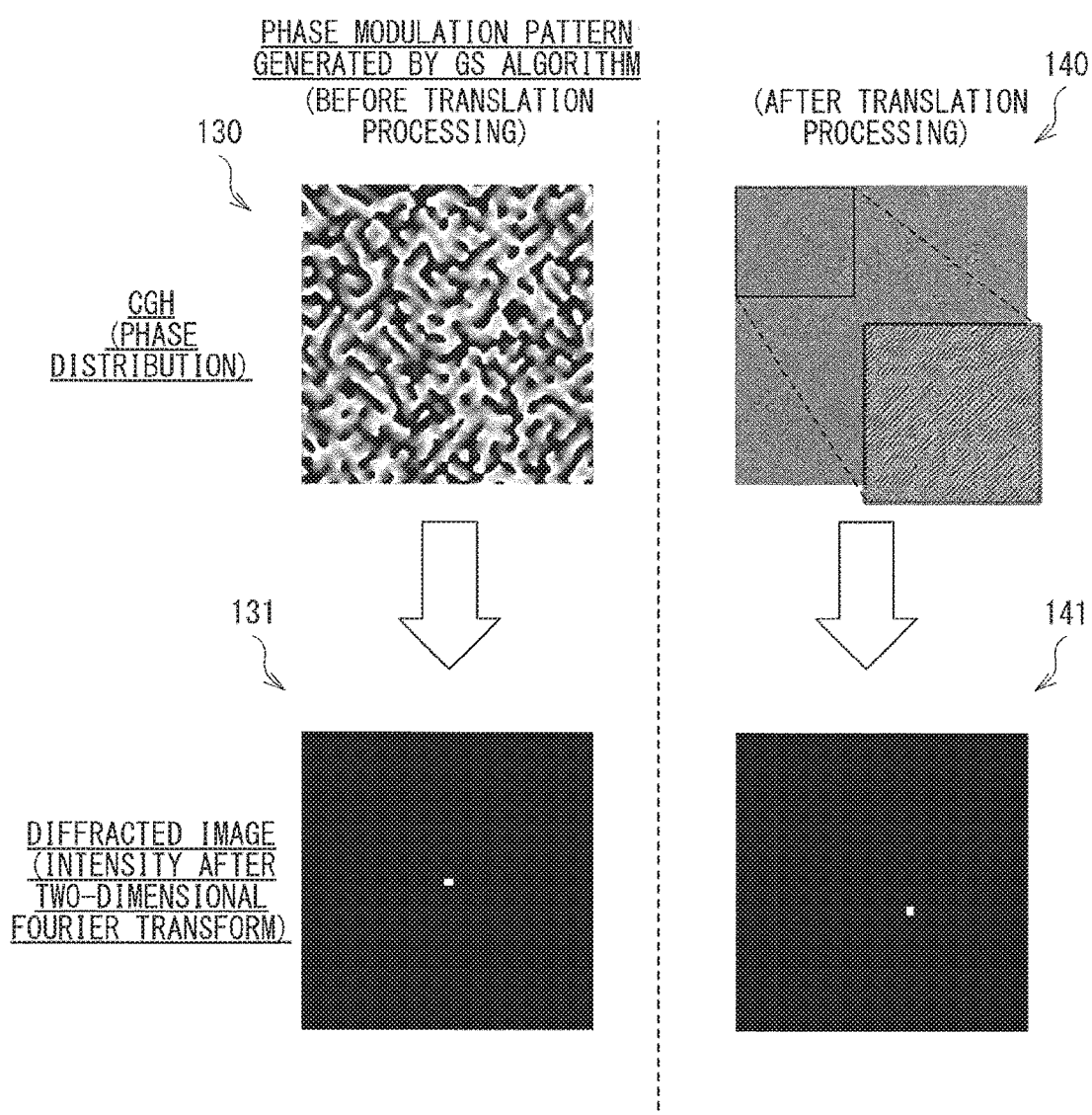

[ FIG. 4 ]
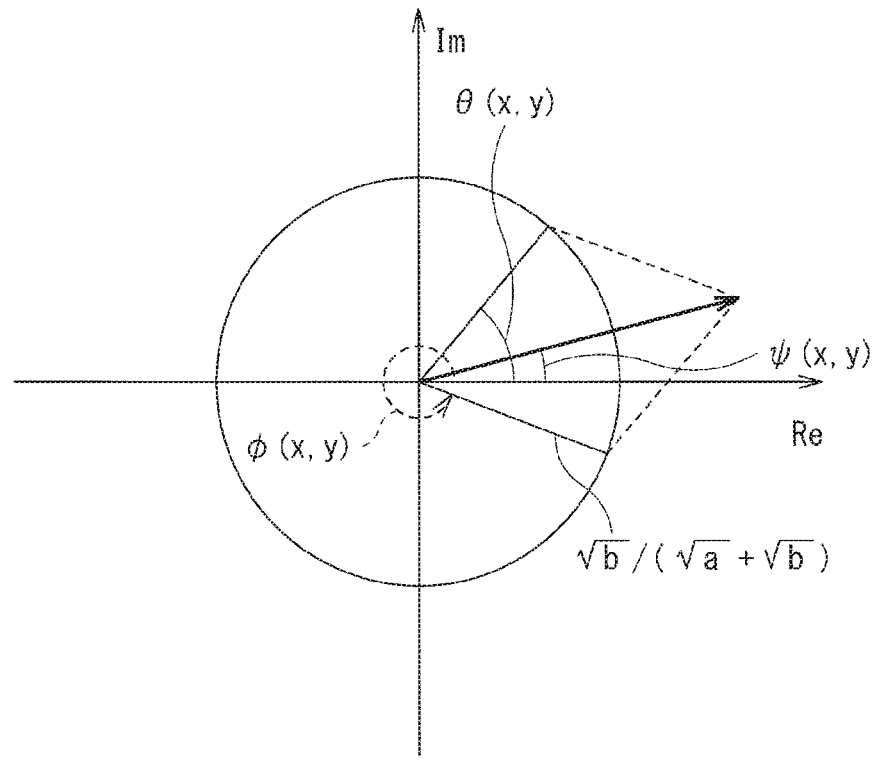
[ FIG. 5 ]
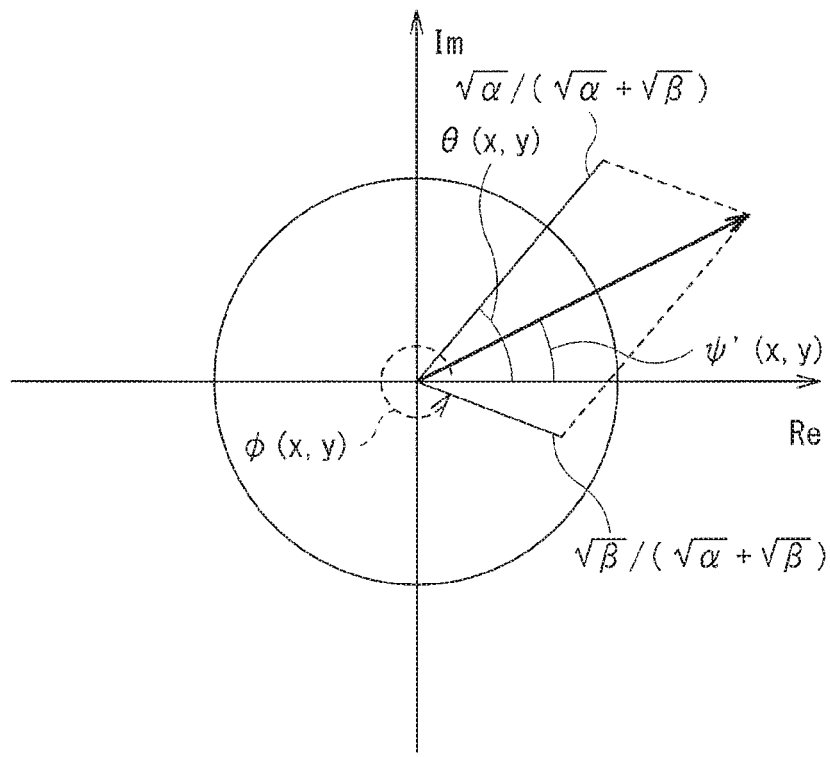

[FIG. 6]
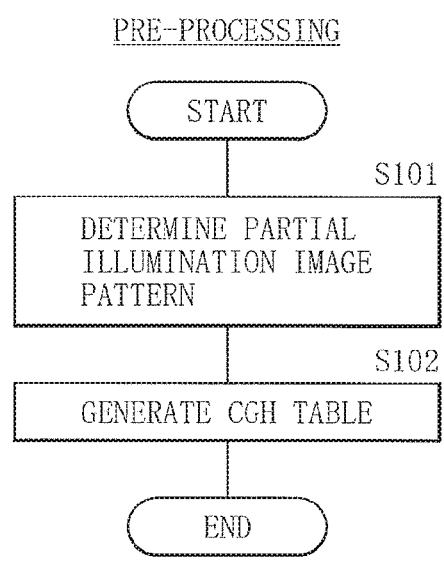

[FIG. 7]
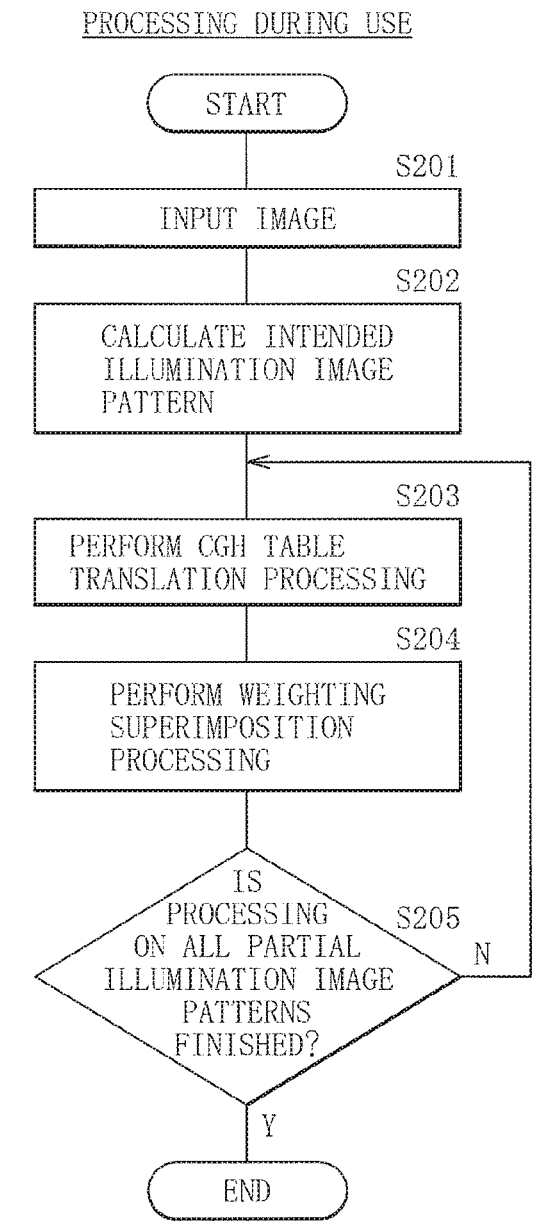

[FIG. 8]
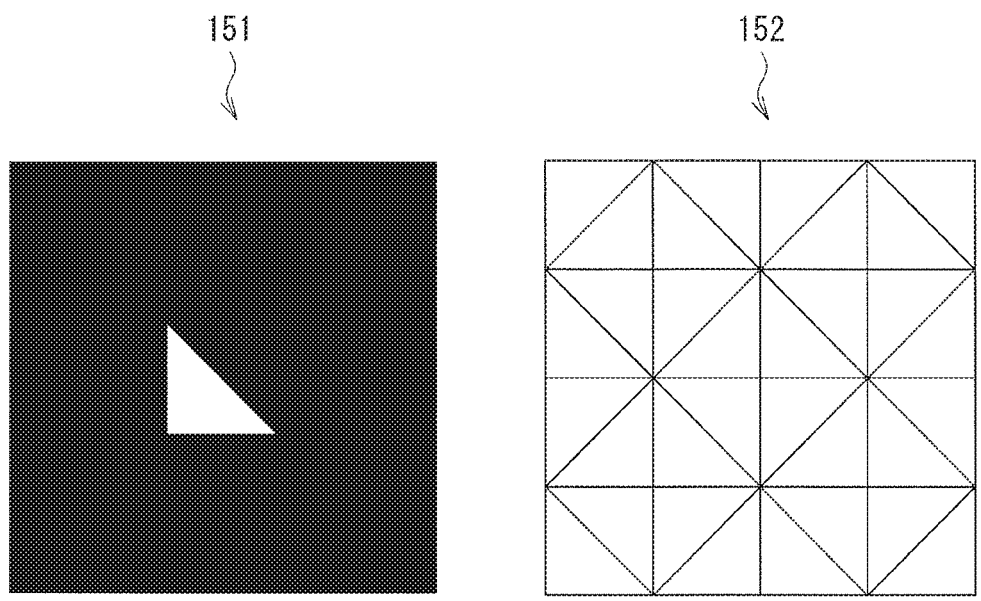

[ FIG. 9 ]
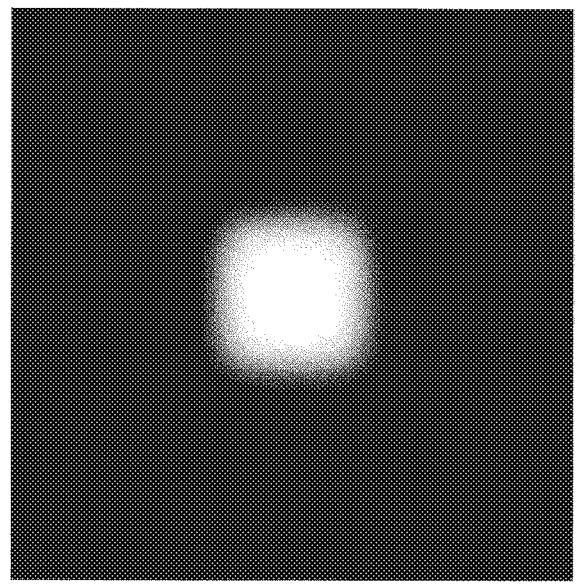
LUMINANCE DISTRIBUTION OF ONE PARTIAL
ILLUMINATION IMAGE PATTERN
LUMINANCE DISTRIBUTION OF TWO PARTIAL
ILLUMINATION IMAGE PATTERNS
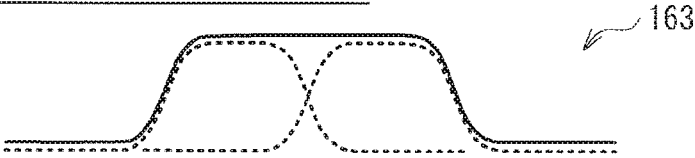

PHASE MODULATION DATA GENERATING UNIT, ILLUMINATION UNIT, AND PROJECTOR

CROSS REFERENCE TO RELATED APPLICATIONS

This application is a U.S. National Phase of International Patent Application No. PCT/JP2018/015519 filed on Apr. 13, 2018, which claims priority benefit of Japanese Patent Application No. JP 2017-099851 filed in the Japan Patent Office on May 19, 2017. Each of the above-referenced applications is hereby incorporated herein by reference in its entirety.

TECHNICAL FIELD

The present disclosure relates to a phase modulation data generating unit that generates phase modulation pattern data to modulate a phase of light, an illumination unit that modulates the phase of light on the basis of the phase modulation pattern data, and a projector that projects an image on the basis of illumination light from the illumination unit.

BACKGROUND ART

There is known a projector that generates a projection image by causing a light intensity modulation device to modulate the intensity of illumination light from an illumination unit. Furthermore, there is a technology for a projector to generate an illumination image pattern modulated in accordance with an image by using a light phase modulation device in an illumination unit and use the illumination image pattern as illumination light applied to a light intensity modulation device. The light phase modulation device is driven on the basis of phase modulation pattern data that makes it possible to reconstruct a desired illumination image pattern.

CITATION LIST

Patent Literature

PTL 1: Japanese Unexamined Patent Application Publication No. 2016-224451

SUMMARY OF THE INVENTION

It is desirable that a calculation cost for generating the above-described phase modulation pattern data be low.

It is desirable to provide a phase modulation data generating unit, an illumination unit, and a projector that make it possible to calculate phase modulation data used for a light phase modulation device to generate an illumination image having a desired luminance distribution at a low calculation cost.

A phase modulation data generating unit according to an embodiment of the present disclosure includes: a first calculating section; and a storage section. The first calculating section calculates basic phase modulation pattern data on the basis of a partial illumination image pattern that makes it possible to generate an intended illumination image pattern having a desired luminance distribution. The basic phase modulation pattern data makes it possible for a light phase modulation device to reconstruct the partial illumination image pattern. The storage section stores the basic phase modulation pattern data calculated by the first calculating section.

An illumination unit according to an embodiment of the present disclosure includes: a light source; a light phase modulation device; a first calculating section; and a storage section. The light phase modulation device modulates a phase of light from the light source. The first calculating section calculates basic phase modulation pattern data on the basis of a partial illumination image pattern that makes it possible to generate an intended illumination image pattern having a desired luminance distribution. The basic phase modulation pattern data makes it possible for the light phase modulation device to reconstruct the partial illumination image pattern. The storage section stores the basic phase modulation pattern data calculated by the first calculating section.

A projector according to an embodiment of the present disclosure includes: an illumination unit; and a light intensity modulation device that modulates intensity of illumination light from the illumination unit to generate a projection image. The illumination unit including a light source, a light phase modulation device, a first calculating section, and a storage section. The light phase modulation device modulates a phase of light from the light source. The first calculating section calculates basic phase modulation pattern data on the basis of a partial illumination image pattern that makes it possible to generate an intended illumination image pattern having a desired luminance distribution. The basic phase modulation pattern data makes it possible for the light phase modulation device to reconstruct the partial illumination image pattern. The storage section stores the basic phase modulation pattern data calculated by the first calculating section.

In the phase modulation data generating unit, the illumination unit, or the projector according to the embodiment of the present disclosure, the basic phase modulation pattern data that makes it possible for the light phase modulation device to reconstruct the partial illumination image pattern is calculated on the basis of the partial illumination image pattern that makes it possible to generate the intended illumination image pattern having the desired luminance distribution, and the calculated basic phase modulation pattern data is stored in the storage section.

According to the phase modulation data generating unit, the illumination unit, or the projector of the embodiment of the present disclosure, the basic phase modulation pattern data that makes it possible to reconstruct the partial illumination image pattern is calculated on the basis of the partial illumination image pattern that makes it possible to generate the intended illumination image pattern, and the calculated basic phase modulation pattern data is stored in the storage section. This makes it possible to calculate the phase modulation data used for the light phase modulation device to generate the illumination image having the desired luminance distribution at a low calculation cost.

It is to be noted that the effects described here are not necessarily limitative, and may be any of effects described in the present disclosure.

BRIEF DESCRIPTION OF DRAWINGS

FIG. 1 is a block diagram illustrating a basic configuration example of a phase modulation data generating unit according to a first embodiment.

FIG. 2 is a block diagram illustrating a basic configuration example of an illumination unit and a projector according to the first embodiment.

FIG. 3 is an explanatory diagram illustrating an example of translation processing of a CGH.

FIG. 4 is an explanatory diagram illustrating an example of weighting superimposition processing in a case where CGHs are weighted with uniform luminance.

FIG. 5 is an explanatory diagram illustrating an example of weighting superimposition processing in a case where CGHs are weighted with any luminance.

FIG. 6 is a flowchart illustrating an example of pre-processing by the phase modulation data generating unit.

FIG. 7 is a flowchart illustrating an example of processing during use by the phase modulation data generating unit.

FIG. 8 is an explanatory diagram illustrating a first modification example of a partial illumination image pattern.

FIG. 9 is an explanatory diagram illustrating a second modification example of the partial illumination image pattern.

MODES FOR CARRYING OUT THE INVENTION

In the following, some embodiments of the present disclosure are described in detail with reference to the drawings. It is to be noted that description is given in the following order.
0. Comparative Example
1. First Embodiment
   1.1 Outline
   1.2 Specific Example of Generation of Phase Modulation Data
   1.3 Effects
2. Other Embodiments 0. Comparative Example A general projector applies illumination light of uniform light density to a spatial light intensity modulation device (a spatial light intensity modulation panel) such as a liquid crystal panel or a DMD (digital mirror device) to project an image with a desired light density. A plurality of modulation elements is two-dimensionally disposed in the spatial light intensity modulation device. Each of the modulation elements controls the reflectance or transmittance of light in accordance with a written signal. An intensity modulation signal written in each modulation element is calculated from an image to be projected. In the general projector, the intensity of uniform illumination light is modulated by the spatial light intensity modulation device, and a desired image is projected through an optical system for projection.

However, in such a general projector, the spatial light intensity modulation device is unable to completely block light, thus there is light leakage into a dark region of an image, which is a phenomenon called black floating. This results in a decrease in contrast. Furthermore, illumination light is applied to even the dark region of the image, wasting electric power not used at the time of projection.

PTL 1 (Japanese Unexamined Patent Application Publication No. 2016-224451) discloses a technology regarding a projector that uses two spatial light modulation devices. In this technology, of the two spatial light modulation devices, the first spatial light modulation device reconstructs an illumination image of which the luminance distribution varies dynamically depending on an image to be projected, and applies the illumination image to the second spatial light modulation device. This reduces light not used in the second spatial light modulation device, and cuts down on electric power to be wasted. It also reduces black floating and increases the peak luminance, and, as a result, the dynamic range of luminance of a projection image is expanded, and the image quality is improved.

Meanwhile, to cause the first spatial light modulation device to generate an illumination image pattern of which the spatial light density varies dynamically, modulation pattern data for that is necessary. For example, in a case of using a spatial light phase modulation device, the data is phase modulation pattern data in which the amount of phase modulation is two-dimensionally stored. This phase modulation pattern data is generally called a computer generated hologram (CGH). Although calculation of a CGH is high in calculation cost, the calculation has become possible with improvement in performance of CPUs (Central Processing Units), GPUs (Graphics Processing Units), etc. in recent years. Nevertheless, equipping a projector product with a calculating unit that performs a high-level calculation leads to an increase in manufacturing cost; therefore, cut-down of the calculation cost is demanded.

1. First Embodiment

[1.1 Outline]
(Outline of Phase Modulation Data Generating Unit)

FIG. 1 illustrates a basic configuration example of a phase modulation data generating unit 1 according to a first embodiment of the present disclosure.

The phase modulation data generating unit 1 includes, as components for performing pre-processing to generate phase modulation data, a partial illumination image pattern data supplying section 10, a phase distribution calculating section 11, and a CGH table storage section 12. Furthermore, the phase modulation data generating unit 1 includes, as components for performing processing during use, an image data supplying section 20, an intended illumination image calculating section 21, a phase distribution calculating section 22, and a CGH data supplying section 23. In the processing during use, the phase modulation data generated through the pre-processing is used.

The phase distribution calculating section 11 is a first calculating section that calculates, on the basis of a partial illumination image pattern 101 that makes it possible to generate an intended illumination image pattern 112 having a desired luminance distribution, data of a basic phase modulation pattern 102 that makes it possible for a spatial light phase modulation device 2 to reconstruct the partial illumination image pattern 101. The basic phase modulation pattern 102 is a CGH.

The CGH table storage section 12 is a storage section that stores the data of the basic phase modulation pattern 102 calculated by the phase distribution calculating section 11.

The phase distribution calculating section 22 is a second calculating section that calculates data of an intended phase modulation pattern 113 that makes it possible for the spatial light phase modulation device 2 to reconstruct the intended illumination image pattern 112 on the basis of the data of the basic phase modulation pattern 102 stored in the CGH table storage section 12.

The phase distribution calculating section 22 performs at least one of translation processing, weighting superimposition processing, rotation processing, inversion processing, or scaling processing, which are described later, on the data of the basic phase modulation pattern 102 stored in the CGH table storage section 12, thereby calculating the data of the intended phase modulation pattern 113.

The spatial light phase modulation device 2 is a diffractive device that is able to dynamically control the diffraction state of light. It is possible to use an LCOS-SLM (Liquid Crystal On Silicon-Spatial Light Modulator) using liquid crystal molecules, a device that mechanically moves a micromirror surface to control the optical path length like a DMD, etc. as the spatial light phase modulation device 2.

FIG. 6 illustrates an example of pre-processing by the phase modulation data generating unit 1.

In the phase modulation data generating unit 1, first, as the pre-processing, the partial illumination image pattern data supplying section 10 determines the partial illumination image pattern 101 in which an entire area of an illumination image applied to the spatial light phase modulation device 2 is divided into a plurality of portions each having any shape (Step S201), and supplies the partial illumination image pattern 101. The phase distribution calculating section 11 calculates, in advance, a CGH of the basic phase modulation pattern 102 for reconstructing the partial illumination image pattern 101. At this time, any existing phase retrieval algorithm such as the Gerchberg-Saxton algorithm (the GS algorithm) is used for generation of the CGH. Data of the CGH calculated here is held as a table (referred to as a CGH table) in the CGH table storage section 12 (Step S202). A data format of the CGH table may be any format such as a vector format, polar representation, and a compression format of two-dimensional image data or a numerical gradient. The partial illumination image pattern 101 reconstructed on the basis of the CGH table held in the CGH table storage section 12 has any shape, and any number of CGH tables are held.

FIG. 7 illustrates an example of processing during use by the phase modulation data generating unit 1.

When the phase modulation data generating unit 1 is actually used in a projector (the processing during use), data of a projection image to be projected by the projector is supplied as data of an input image 111 from the image data supplying section 20 (Step S201). The input image 111 is, for example, image data of each frame of a moving image.

The intended illumination image calculating section 21 calculates the intended illumination image pattern 112 from the data of the input image 111 (Step S202). The intended illumination image calculating section 21 calculates the intended illumination image pattern 112 that is able to be represented by performing at least one of translation processing, weighting superimposition processing, rotation processing, inversion processing, or scaling processing on the plurality of partial illumination image patterns 101. The phase distribution calculating section 22 invokes a CGH table from the CGH table storage section 12, and performs at least one of translation processing, weighting superimposition processing, rotation processing, inversion processing, or scaling processing, which are described later, on data of the basic phase modulation pattern 102 that makes it possible to reconstruct the partial illumination image pattern 101, thereby calculating CGH data of the intended phase modulation pattern 113 that makes it possible to reconstruct the intended illumination image pattern 112. FIG. 7 illustrates an example of a case where after the translation processing is performed (Step S202), the weighting superimposition processing is performed (Step S203). The intended illumination image calculating section 21 determines whether or not the processing on all the partial illumination image patterns 101 is finished (Step S205). In a case where it is determined that the processing on all the partial illumination image patterns 101 is not finished (Step S205; N), the flow returns to the process at Step S103. In a case where it is determined that the processing on all the partial illumination image patterns 101 is finished (Step S205; Y), the processing ends (Step S206). The calculation by the phase distribution calculating section 22 here is made without using a phase retrieval algorithm that is high in calculation cost. After that, the intended illumination image pattern 112 is reconstructed by driving the spatial light phase modulation device 2 on the basis of the CGH data of the intended phase modulation pattern 113.

(Outlines of Illumination Unit and Projector)

FIG. 2 illustrates a basic configuration example of an illumination unit and a projector 30 according to the first embodiment.

The projector 30 includes the spatial light phase modulation device 2, a spatial light intensity modulation device 3, a light source 31, a decoder 32, a storage unit 33, a calculating unit 34, a light phase modulation device driving circuit 35, and a light intensity modulation device driving circuit 36.

The illumination unit in the projector 30 includes at least the light source 31, the spatial light phase modulation device 2, the storage unit 33, the calculating unit 34, and the light phase modulation device driving circuit 35.

The spatial light phase modulation device 2 modulates a phase of light from the light source 31. The light source 31 is, for example, a laser light source.

The projector 30 may include the phase modulation data generating unit 1.

The storage unit 33 has stored at least the CGH table stored in the CGH table storage section 12 of the phase modulation data generating unit 1. The storage unit 33 may be a non-volatile storage unit, a volatile storage unit, or a combination of these.

The calculating unit 34 may include the phase distribution calculating section 11, the intended illumination image calculating section 21, the phase distribution calculating section 22, and the CGH data supplying section 23 of the phase modulation data generating unit 1. The calculating unit 34 includes, for example, at least one of a CPU, a GPU, an FPGA (Field-Programmable Gate Array), or an ASIC (Application Specific Integrated Circuit).

The CGH table has been stored in the storage unit 33 in advance. The projector 30 acquires, for example, image data of each frame of a moving image by causing the decoder 32 to decode or decompress an inputted image signal. The spatial light intensity modulation device 3 is driven by the light intensity modulation device driving circuit 36 on the basis of the image data.

Furthermore, the image data is inputted to the calculating unit 34. The calculating unit 34 calculates, on the basis of the image data and the CGH table, data of the intended phase modulation pattern 113 that is final CGH data which makes it possible to reconstruct the intended illumination image pattern 112. The spatial light phase modulation device 2 is driven by the light phase modulation device driving circuit 35 on the basis of the CGH data generated by the calculating unit 34. Accordingly, the intended illumination image pattern 112 having a desired luminance distribution is reconstructed by the spatial light phase modulation device 2.

If image quality necessary in actual use is obtained only by an illumination image achieved by the spatial light phase modulation device 2, the subsequent spatial light intensity modulation device 3 does not have to be provided. The use of the spatial light intensity modulation device 3 makes it possible to modulate the intensity of the intended illumination image pattern 112 including at least one of the partial illumination image patterns 101 into high resolution and improve the resolution of a projection image. Illumination light of a uniform illumination pattern 121 having a fixed luminance distribution, such as uniform-luminance illumination light used in an existing projector, is applied to the spatial light phase modulation device 2. Then, an illumination image generated through phase modulation and diffraction by the spatial light phase modulation device 2 is applied, as illumination light, to the spatial light intensity modulation device 3. The spatial light intensity modulation device 3 generates a projection image by modulating the intensity of the illumination light. The projection image generated by the spatial light intensity modulation device 3 is projected onto a projection plane such as a screen by a projection optical system that is not illustrated.

[1.2 Specific Example of Generation of Phase Modulation Data]

The phase distribution calculating section 22 performs at least one of translation processing, weighting superimposition processing, rotation processing, inversion processing, or scaling processing, which are described later, on the data (CGH) of the basic phase modulation pattern 102 stored in the CGH table storage section 12, thereby calculating the data of the intended phase modulation pattern 113.

(Translation Processing)

An example of translation (shift) processing of a CGH is described. A CGH of a phase distribution $\theta(x,y)$ is assumed to be written on the spatial light phase modulation device 2, where (x,y) denotes two-dimensional coordinates on the spatial light phase modulation device 2. In a case where a plane wave of laser light or the like with an amplitude of A(x,y) enters that, an electric field distribution f(x,y) of the spatial light phase modulation device 2 immediately thereafter is expressed by the following Expression (1).

[Expression 1]

$$f(x,y)=A(x,y)\exp(-i\theta(x,y)) \quad (1)$$

Expression (1) ignores phase terms of time and position of the incident light. If diffraction conforms to Fraunhofer diffraction, the following Expression (2) holds, where and $F(\xi, \eta)$ denote two-dimensional coordinates and an electric field distribution on an illumination image, respectively.

[Expression 2]

$$F(\zeta, \eta) = \int\int f(x, y)\exp\left[-i\frac{2\pi}{\lambda f}(x\zeta + \eta y)\right]dxdy = FT[f(x, y)] \quad (2)$$

$F(\xi, \eta)$ is obtained by performing two-dimensional Fourier transform on f(x,y). FT[ ] denotes an operator of Fourier transform. Then, to translate the illumination image by (n, m) on a ($\xi$, $\eta$) plane, the following Expression (3) is obtained on the basis of a formula of discrete Fourier transform.

[Expression 3]

$$F(\xi - n, \eta - m) = FT\left[f(x, y)\exp\left[2\pi i\left(\frac{nx}{N} + \frac{my}{M}\right)\right]\right] \quad (3)$$

N and M each denote the number of samples. The number of samples of f(x,y) is the resolution of the spatial light phase modulation device 2, offering the following Expression (4) where N and M are WIDTH and HEIGHT, respectively.

[Expression 4]

$$F(\xi - n, \eta - m) = FT\left[f(x, y)\exp\left[2\pi i\left(\frac{nx}{\text{WIDTH}} + \frac{my}{\text{HEIGHT}}\right)\right]\right] \quad (4)$$

That is, the addition of a phase obtained from the coordinates (x,y) and the translation amount (n, m) on the CGH makes it possible to perform translation processing of the CGH.

FIG. 3 illustrates an example of translation processing of a CGH.

The left portion of FIG. 3 illustrates a basic phase modulation pattern 130 (a CGH) generated by the GS algorithm and a diffracted image 131 (intensity after two-dimensional Fourier transform) of the basic phase modulation pattern 130. The diffracted image 131 is an illumination image having a rectangular high-luminance region in the middle. The right portion of FIG. 3 illustrates a phase modulation pattern 140 (a CGH) after the translation processing and a diffracted image 141 (intensity after two-dimensional Fourier transform) of the phase modulation pattern 140 after the translation processing.

(Weighting Superimposition Processing)

Subsequently, weighting superimposition processing of a CGH is described. To reconstruct an illumination image depending on an intended luminance distribution, respective CGHs of which the CGH tables have been subjected to translation processing are superimposed. In the superimposition processing, the linearity of Fourier transform is used as in the following Expression (5).

[Expression 5]

$$FT[af(x,y)+bg(x,y)]=aFT[f(x,y)]+bFT[g(x,y)] \quad (5)$$

Here, f(x,y) and g(x,y) denote electric field distributions immediately after phase modulation by the spatial light phase modulation device 2 such as an SLM with $\theta(x,y)$ and $\phi(x, y)$ written therein. $\theta(x,y)$ and $\phi(x,y)$ are CGHs different from each other. If an intensity distribution of incident laser light is uniformly 1, f(x,y) and g(x,y) are expressed by the following Expression (6) on the basis of Expression (1).

[Expression 6]

$$f(x,y)=\exp(-i\theta(x,y))$$
$$g(x,y)=\exp(-i\varphi(x,y)) \quad (6)$$

Furthermore, if a=b=1, which means that weights are uniform, a CGH for reconstructed images FT[f(x,y)] and FT[g(x,y)] to be superimposed is expressed by the following Expression (7).

[Expression 7]

$$f(x, y) + g(x, y) = \exp(-i\theta(x, y)) + \exp(-i\varphi(x, y)) = \quad (7)$$
$$(\cos\theta(x, y) + \cos\varphi(x, y)) - i(\sin\theta(x, y) + \sin\varphi(x, y)) =$$
$$C(x, y)\exp\left[-i\tan^{-1}\frac{\sin\theta(x, y) + \sin\varphi(x, y)}{\cos\theta(x, y) + \cos\varphi(x, y)}\right]$$

C(x,y) denotes a scale factor of a real number that varies by pixel. Then, it is possible to obtain the following Expression (8), where $\psi(x,y)$ denotes the CGH after superimposition.

[Expression 8]

$$\phi(x, y) = \tan^{-1} \frac{\sin\theta(x, y) + \sin\varphi(x, y)}{\cos\theta(x, y) + \cos\varphi(x, y)} \quad (8)$$

In a case where θ(x,y) and φ(x,y) are superimposed at an intensity ratio of α:β on a reconstructed image surface, the ratio of electric field amplitude is √α:√β. Therefore, a and b in Expression (5) are expressed by the following Expression (9).

[Expression 9]

$$a = \frac{\sqrt{\alpha}}{\sqrt{\alpha} + \sqrt{\beta}}$$

$$b = \frac{\sqrt{\beta}}{\sqrt{\alpha} + \sqrt{\beta}} \quad (9)$$

If denoted by ψ'(x,y), the CGH after the superimposition is expressed by following Expression (10).

[Expression 10]

$$\phi'(x, y) = \tan^{-1} \frac{\sqrt{\alpha}\sin\theta(x, y) + \sqrt{\beta}\sin\varphi(x, y)}{\sqrt{\alpha}\cos\theta(x, y) + \sqrt{\beta}\cos\varphi(x, y)} \quad (10)$$

FIG. 4 illustrates an example of weighting superimposition processing in a case where CGHs are weighted with uniform luminance. FIG. 4 illustrates calculation of ψ(x,y) on a complex plane. FIG. 5 illustrates an example of weighting superimposition processing in a case where CGHs are weighted with any luminance. FIG. 5 illustrates calculation of ψ'(x,y) on a complex plane.

When a phase of the CGH at the coordinates (x,y) after the superimposition is uniformly weighted, i.e., superimposed with uniform luminance of a partial illumination image pattern 101, an argument after respective points on a unit circle are added up is ψ(x,y) as illustrated in FIG. 4. Meanwhile, when it is weighted with any luminance, an argument obtained by scaling and then adding up respective distances from the origin is ψ'(x,y) as illustrated in FIG. 5. For example, in a case where the spatial light phase modulation device 2 is an 8-bit display device, a phase of 0 to 2π is normalized or quantized into an integer of 0 to 255 when written in the spatial light phase modulation device 2.

(Other Calculations)

In inversion processing and rotation processing of the partial illumination image pattern 101, it is possible to use inversion processing and rotation processing of a CGH table. As the inversion processing, horizontal inversion processing, vertical inversion processing, and horizontal and vertical inversion processing are possible. Scaling processing of the CGH table makes it possible to scale the partial illumination image pattern 101, on the basis of the similarity of Fourier transform.

(Other Examples of Partial Illumination Shapes)

FIG. 8 illustrates a first modification example of the partial illumination image pattern 101.

The left portion of FIG. 8 illustrates a partial illumination image pattern 151 according to the first modification example. The right portion of FIG. 8 illustrates a divided illumination image pattern 152 in a case where an intended illumination image pattern is generated on the basis of the partial illumination image pattern 151. For example, performing horizontal and vertical inversion processing on basic phase modulation pattern data to reconstruct the partial illumination image pattern 151 in the shape of an isosceles right triangle as illustrated in the left portion of FIG. 8 makes it possible to reconstruct any one or more divided regions of the divided illumination image pattern 152 illustrated in the right portion of FIG. 8.

FIG. 9 illustrates a second modification example of the partial illumination image pattern 101.

The partial illumination image pattern 101 may have a luminance gradient. The upper portion of FIG. 9 illustrates a partial illumination image pattern 161 according to the second modification example. It illustrates an example where the partial illumination image pattern 161 has a square shape as a basic shape, and the contour of the square has a luminance gradient offered by a sigmoid function and blurred. Furthermore, FIG. 9 illustrates a luminance distribution 162 of the one partial illumination image pattern 161 and a luminance distribution 163 in a case where the two partial illumination image patterns 161 are coupled to each other. In the luminance distribution 163 in the case where the two are coupled, luminance at the boundary of a coupled portion is substantially uniform.

[1.3 Effects]

As described above, according to the present embodiment, on the basis of the partial illumination image pattern 101 that makes it possible to generate the intended illumination image pattern 112, the data of the basic phase modulation pattern 102 that makes it possible to reconstruct the partial illumination image pattern 101 is calculated, and the calculated data of the basic phase modulation pattern 102 is stored in the CGH table storage section 12; therefore, it is possible to calculate the data of the intended phase modulation pattern 113 to generate the illumination image having the desired luminance distribution at a low calculation cost. Accordingly, it is possible to reduce a manufacturing cost associated with the calculating unit 34 of the projector 30. This also contributes to improvement in the reconstruction frame rate of a moving image in the projector 30.

It is to be noted that the effects described in the present specification are merely illustrative and not limitative, and there may be other effects.

2. Other Embodiments

The technology according to the present disclosure is not limited to the description of the foregoing embodiment, and may be modified in a variety of ways.

For example, the present technology may also have the following configurations.

(1)

A phase modulation data generating unit including:

a first calculating section that calculates basic phase modulation pattern data on the basis of a partial illumination image pattern that makes it possible to generate an intended illumination image pattern having a desired luminance distribution, the basic phase modulation pattern data making it possible for a light phase modulation device to reconstruct the partial illumination image pattern; and a storage section that stores the basic phase modulation pattern data calculated by the first calculating section.

(2)

The phase modulation data generating unit according to (1), further including a second calculating section that calculates intended phase modulation pattern data that makes it possible for the light phase modulation device to reconstruct the intended illumination image pattern on the basis of the basic phase modulation pattern data stored in the storage section.

(3)

The phase modulation data generating unit according to (2), in which the second calculating section performs at least one of translation processing, weighting superimposition processing, rotation processing, inversion processing, or scaling processing on the basic phase modulation pattern data stored in the storage section, thereby calculating the intended phase modulation pattern data.

(4)

The phase modulation data generating unit according to any one of (1) to (3), in which the basic phase modulation pattern data includes a computer generated hologram.

(5)

An illumination unit including:
a light source;
a light phase modulation device that modulates a phase of light from the light source;
a first calculating section that calculates basic phase modulation pattern data on the basis of a partial illumination image pattern that makes it possible to generate an intended illumination image pattern having a desired luminance distribution, the basic phase modulation pattern data making it possible for the light phase modulation device to reconstruct the partial illumination image pattern; and
a storage section that stores the basic phase modulation pattern data calculated by the first calculating section.

(6)

The illumination unit according to (5), further including a second calculating section that calculates intended phase modulation pattern data that makes it possible for the light phase modulation device to reconstruct the intended illumination image pattern on the basis of the basic phase modulation pattern data stored in the storage section.

(7)

The illumination unit according to (6), in which the calculating section performs at least one of translation processing, weighting superimposition processing, rotation processing, inversion processing, or scaling processing on the basic phase modulation pattern data in the storage section, thereby calculating the intended phase modulation pattern data.

(8)

The illumination unit according to any one of (5) to (7), in which the basic phase modulation pattern data includes a computer generated hologram.

(9)

A projector including:
an illumination unit; and
a light intensity modulation device that modulates intensity of illumination light from the illumination unit to generate a projection image,
the illumination unit including
a light source,
a light phase modulation device that modulates a phase of light from the light source,
a first calculating section that calculates basic phase modulation pattern data on the basis of a partial illumination image pattern that makes it possible to generate an intended illumination image pattern having a desired luminance distribution, the basic phase modulation pattern data making it possible for the light phase modulation device to reconstruct the partial illumination image pattern, and
a storage section that stores the basic phase modulation pattern data calculated by the first calculating section.

This application claims the priority on the basis of Japanese Patent Application No. 2017-099851 filed with Japan Patent Office on May 19, 2017, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A phase modulation data generating unit, comprising:
a first calculating section configured to calculate basic phase modulation pattern data based on a partial illumination image pattern that makes it possible to generate an intended illumination image pattern having a desired luminance distribution, the basic phase modulation pattern data making it possible for a light phase modulation device to reconstruct the partial illumination image pattern;
a storage section configured to store the basic phase modulation pattern data calculated by the first calculating section; and
a second calculating section configured to calculate intended phase modulation pattern data that makes it possible for the light phase modulation device to reconstruct the intended illumination image pattern based on the basic phase modulation pattern data stored in the storage section.

2. The phase modulation data generating unit according to claim 1, wherein the second calculating section is further configured to execute at least one of a translation processing operation, a weighting superimposition processing operation, a rotation processing operation, an inversion processing operation, or a scaling processing operation on the basic phase modulation pattern data stored in the storage section, to calculate the intended phase modulation pattern data.

3. The phase modulation data generating unit according to claim 1, wherein the basic phase modulation pattern data comprises a computer generated hologram.

4. An illumination unit, comprising:
a light source;
a light phase modulation device configured to modulate a phase of light from the light source;
a first calculating section configured to calculate basic phase modulation pattern data based on a partial illumination image pattern that makes it possible to generate an intended illumination image pattern having a desired luminance distribution, the basic phase modulation pattern data making it possible for the light phase modulation device to reconstruct the partial illumination image pattern;
a storage section configured to store the basic phase modulation pattern data calculated by the first calculating section; and
a second calculating section configured to calculate intended phase modulation pattern data that makes it possible for the light phase modulation device to reconstruct the intended illumination image pattern based on the basic phase modulation pattern data stored in the storage section.

5. The illumination unit according to claim 4, wherein the second calculating section configured to execute at least one of translation processing, weighting superimposition processing, rotation processing, inversion processing, or scaling processing on the basic phase modulation pattern data stored in the storage section, to calculate the intended phase modulation pattern data.

6. The illumination unit according to claim 4, wherein the basic phase modulation pattern data comprises a computer generated hologram.

7. A projector, comprising:
an illumination unit; and
a light intensity modulation device configured to modulate an intensity of illumination light from the illumination unit to generate a projection image,
the illumination unit including:
a light source,
a light phase modulation device configured to modulate a phase of light from the light source,
a first calculating section configured to calculate basic phase modulation pattern data based on a partial illumination image pattern that makes it possible to generate an intended illumination image pattern having a desired luminance distribution, the basic phase modulation pattern data making it possible for the light phase modulation device to reconstruct the partial illumination image pattern,
a storage section configured to store the basic phase modulation pattern data calculated by the first calculating section, and
a second calculating section configured to calculate intended phase modulation pattern data that makes it possible for the light phase modulation device to reconstruct the intended illumination image pattern based on the basic phase modulation pattern data stored in the storage section.

* * * * *